United States Patent
Alfredsson

[11] Patent Number: 5,592,854
[45] Date of Patent: Jan. 14, 1997

[54] MOTOR VEHICLE GEARBOX

[75] Inventor: Sverker Alfredsson, Västra Frölunda, Sweden

[73] Assignee: AB Volvo, Gothenburg, Sweden

[21] Appl. No.: 403,830
[22] PCT Filed: Sep. 20, 1993
[86] PCT No.: PCT/SE93/00761
    § 371 Date: Mar. 21, 1995
    § 102(e) Date: Mar. 21, 1995
[87] PCT Pub. No.: WO94/07055
    PCT Pub. Date: Mar. 31, 1994

[30] Foreign Application Priority Data

Sep. 21, 1992 [SE] Sweden .................. 9202722

[51] Int. Cl.⁶ ........................ F16H 3/08
[52] U.S. Cl. ........................ 74/331; 74/359
[58] Field of Search .................. 74/331, 359

[56] References Cited

U.S. PATENT DOCUMENTS

| | | | |
|---|---|---|---|
| 4,269,077 | 5/1981 | Vandervoort | 74/331 |
| 5,150,628 | 9/1992 | Alfredsson | 74/330 |
| 5,388,472 | 2/1995 | Alfredsson | 74/331 |

Primary Examiner—Allan D. Herrmann
Attorney, Agent, or Firm—Young & Thompson

[57] ABSTRACT

Motor vehicle gearbox of the "power shift" type with two intermediate shafts (3, 4) for alternately transmitting an input torque to an output shaft (5). The intermediate shafts each present a pair of lockable gear wheels (10, 11 and 15, 16, resp.), rotatably mounted on respective shafts and lockable by couplings (12, 13 and 18, 19, resp.). The gear wheels engage with a pair of gear wheels (20, 21) common for both the intermediate shafts, mounted rotatably on the output shaft and drivably coupled together in order to allow torque transmission from the one intermediate shaft (3) to the other intermediate shaft (4) via either one or both of the common gear wheels (20, 21).

7 Claims, 2 Drawing Sheets

MOTOR VEHICLE GEARBOX

FIELD OF THE INVENTION

The present invention relates to a motor vehicle gearbox comprising two intermediate shafts for transmission of an input torque to an output shaft, whereby a first gear wheel, rotatably mounted on each intermediate shaft and lockable by means of coupling means on respective shafts, is in engagement with a common gear wheel rotatably mounted with respect to the output shaft and lockable for rotation together with the output shaft, said gear wheel being arranged to transmit torque from one intermediate shaft to the other in the disengaged position.

BACKGROUND OF THE INVENTION

Two main types of gearbox of the above mentioned type are known for example from U.S. Pat. Nos. 5,150,628 and 5,388,472. Both these gearbox types are so-called "power shift" gearboxes in which the torque is transmitted alternately via both the intermediate shafts to the output shaft, which means that whilst the torque is being transmitted by one of the intermediate shafts the next gear is preselected on the other intermediate shaft, whereby gear changing itself occurs in that the first intermediate shaft is disengaged and the other is engaged. This can be achieved either by driving the input shaft of each of the intermediate shafts and alternately engaging the input shafts via a pair of clutches outside the gearbox as shown in the aforementioned U.S. Pat. No. 5,388,472, or by driving both intermediate shafts from a common input shaft via friction clutches arranged within the gearbox housing as shown in the aforementioned U.S. Pat. No. 5,150,628.

A characteristic of these known gearboxes is that the torque in a gear stage, namely the lowest gear, is transmitted via both intermediate shafts by means of a common gear wheel. In this way an additional reduction stage is achieved compared with the torque transmission, via only one intermediate shaft at a time, which allows the possibility of higher gearing in the lowest gear than can otherwise be obtained. Alternatively, for a given gearing, larger gear wheels can be used than with torque transmission via an intermediate shaft. The construction gives an extra gear stage without the gearbox needing to be complemented with additional cooperating gear wheels. The result is a very short and compact gearbox with a large number of gears.

OBJECT OF THE INVENTION

The object of the present invention, starting from the gearbox described in the introduction, is to achieve a compact gearbox with many gear stages and with larger span, that is to say larger separation between the lowest and highest gears than can practically be obtained with the described known gearboxes.

SUMMARY OF THE INVENTION

This is achieved according to the invention in that at least a second gear wheel on each intermediate shaft is in engagement with at least a second common gear wheel which is driveably coupled to the first common gear wheel in order to allow torque transmission from said first gear wheel on said first-mentioned intermediate shaft to said second gear wheel on the second intermediate shaft via both the common gear wheels, and in that the second intermediate shaft is divided into two parts rotatable relative to each other, said parts being able to be coupled to each other by coupling means for rotation as a unit.

By creating an additional reduction stage in this way with a second common gear wheel which is smaller than the first common gear wheel, an extremely high gearing can be achieved in the lowest gear. Moreover two additional gears are obtained which, starting from the seven-gear gearbox of the above described known types, give a compact nine-gear gearbox with larger span than can be achieved in these.

BRIEF DESCRIPTION OF THE INVENTION

The invention will now be described in more detail with reference to the embodiments shown in the accompanying drawings wherein FIG. 1 and 2 are two identical figures of a schematically represented gearbox with the torque flow depicted on the different gears.

DETAILED DESCRIPTION OF THE INVENTION

Figure 1:
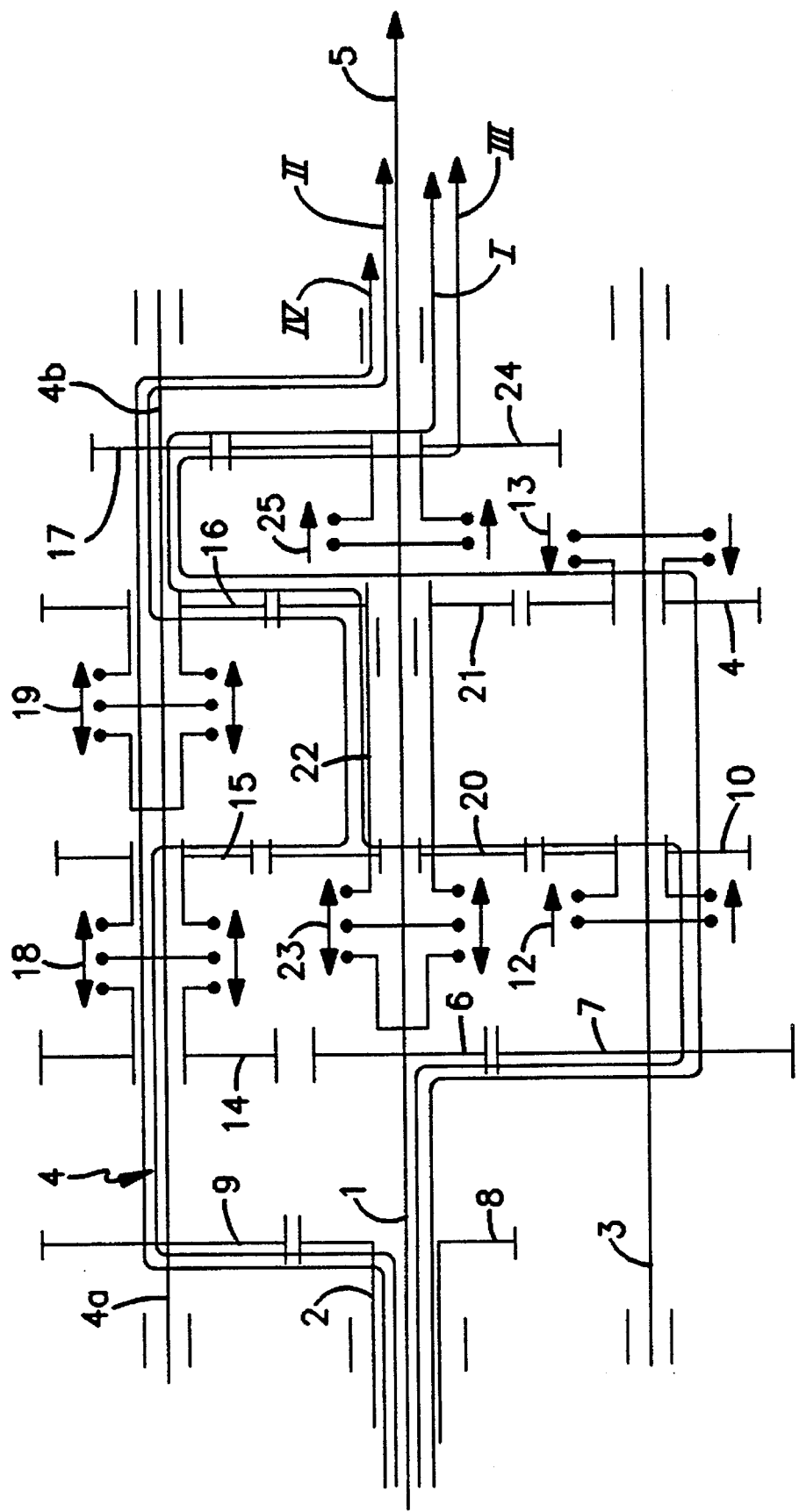
Figure 2:
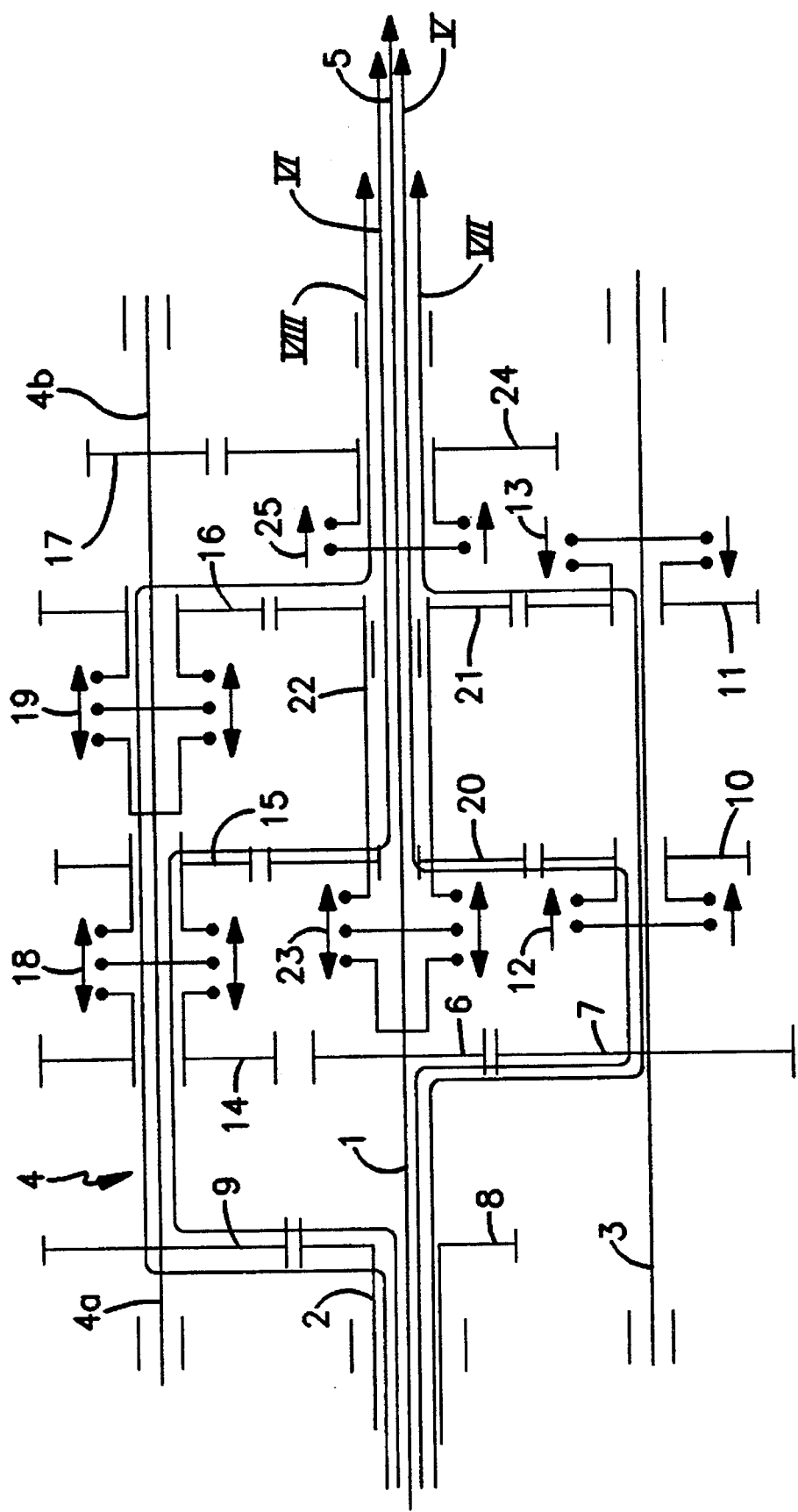

In the figures, numerals 1 and 2 denote two concentrically mounted input shafts, 3 a first intermediate shaft, 4 a second intermediate shaft and 5 and output shaft. One of the input shafts drives the first intermediate shaft 3 via a pair of gear wheels 6 and 7 respectively fixed against rotation on respective shafts. The second input shaft 2 drives the second intermediate shaft 4 via a pair of gear wheels 8 and 9 respectively fixed against rotation on respective shafts. In the shown embodiment it is presumed that both input shafts I and 2 are alternately engageable and disengageable respectively by means of friction clutches (not shown in detail), such as shown in U.S. Pat. No. 5,388,472, for alternately driving the intermediate shafts 3, 4.

The first intermediate shaft 3 supports two freely rotatably mounted gear wheels 10 and 11 which are lockable to the intermediate shaft 3 by means of each one's clutch sleeve 12 and 13 respectively and of which gear wheel 11 comprises a second gear wheel. A first, second and third gear wheel 14, 15, and 16 are freely rotatably mounted on the second intermediate shaft 4 which is divided into an input shaft portion 4a and an output shaft portion 4b which are freely rotatably mounted with respect to each other. A fourth gear wheel 17 is fixedly mounted on the intermediate output shaft portion 4b. The gear wheels 14 and 15 are engageable by means of a clutch sleeve 18 whilst the gear wheel 16, which comprises a third gear wheel is engageable by means of clutch sleeve 19 which also has an engagement position in which both the shaft portions 4a and 4b are locked together to be driven as an unit.

The shafts lie in a V-formation and the gear wheel 14 on the intermediate shaft 4 engages with gear wheel 7 on intermediate shaft 3. The gear wheels 10 and 15 on shafts 3 and 4 respectively engage with a first common gear wheel 20 which is rotatably mounted on the output shaft 5 whilst the gear wheels 11 and 16 on the shafts 3 and 4 respectively engage with a second common gear wheel 21 with smaller diameter than gear wheel 20.

The gear wheel 21 is also rotatably mounted on the output shaft 5. In the shown embodiment the gear wheels 20, 21 are fixed onto a common hub 22 which is lockable to the output shaft in an engagement position of the clutch sleeve 23. In another engagement position of the clutch sleeve 23, the input shaft 1 and the output shaft 5 are coupled together for rotation as a unit. An additional gear wheel 24 on the output shaft 5 is rotatably mounted on the shaft and lockable to this by means of a clutch sleeve 25. The gear wheel 24 engages with the gear wheel 17 on the intermediate shaft portion 4b. As an alternative to the shown embodiment, the gear wheel 16 can be fixedly mounted on the intermediate output shaft portion 4b and the gear wheel 21 can be rotatably mounted as well as being lockable to the hub 22 by clutch means.

The clutch sleeves 12, 13, 18, 19, 23 and 25 can be included in the clutch arrangements which comprise conventional synchronization devices, but the described gearbox is particularly designed to make use of a central synchronization arrangement of the type which is shown and described in the introductory portion of the cited publications.

The gearbox which is shown and described has nine gears, whereby the torque is transmitted to the output shaft 5 alternately between the input shaft 1 and 2, the intermediate shaft 3 and the intermediate shaft portions 4a, 4b, via the following cooperating gear-pairs, as indicated by the arrows I–VIII in the figures:

| | |
|---|---|
| First | 6,7 → 10,20 → 21,16 → 17,24; |
| Second | 8,9 → 15,20 → 21,16 → 17,24; |
| Third | 6,7 → 11,21 → 21,16 → 17,24 |
| Fourth | 8,9 → 17,24; |
| Fifth | 6,7 → 10,20; |
| Sixth | 8,9 → 15,20; |
| Seventh | 6,7 → 11,21; |
| Eighth | 8,9 → 16,21 |
| Ninth | Direct drive from the input shaft 1 to the output shaft 5 with clutch sleeve 23 in the aforementioned second coupling position |
| Reverse | 6,7 → 7,14 → 15,20 → 21,11 → 17,24; |

From the table above it is clear that the common gear wheels 20, 21 are used at the same time with torque transmission in first and second gears in order to give extra high gearing in these gears by means of the additional reduction stage which is thus obtained. Additionally it is clear that the clutch sleeve 19 has an engagement position in eight gear with which the intermediate shaft portions 4a, 4b are coupled together at the same time as the gear wheel 16 is locked to the axle portion 4b. This is also true correspondingly for the clutch sleeve 18 which in reverse locks both the gear wheel 14 and the gear wheel 15 to the intermediate shaft portion 4a.

The invention has been described above with reference to a preferred embodiment having nine forward gears. Additional gearing stages can be achieved with more than two common gear wheels according to the described principle.

The invention is of course not limited to a gearbox of the above described type with two input shafts, but can be used in a gearbox with one single input shaft, for example of the type shown in U.S. Pat. No. 5,150,628.

I claim:

1. In a motor vehicle gearbox, comprising two intermediate shafts for transmission of an input torque to an output shaft, whereby a first gear wheel, rotatably mounted on each intermediate shaft and lockable by means of coupling means on respective shaft, is in engagement with a common gear wheel rotatably mounted with respect to the output shaft and lockable for rotation together with the output shaft, said gear wheel being arranged to transmit torque from one intermediate shaft to the other in the disengaged position; the improvement comprising at least one second gear wheel (11, 16) on each intermediate shaft (3, 4) engagement with at least a second common gear wheel (21) which is drivably coupled to a first common gear wheel (20) in order to allow torque transmission from said first gear wheel (10) on said first-mentioned intermediate shaft (3) to said second gear wheel (16) on the second intermediate shaft (4) via both the common gear wheels (20,21), the second intermediate shaft (4) being divided into two parts (4a, 4b) rotatable relative to each other, said parts being engageable with each other by means of coupling means (19) for rotation as a unit.

2. Gearbox according to claim 1, wherein the second intermediate shaft (4) comprises an input shaft portion (4a) and an output shaft portion (4b) which, in the shaft portions' disengaged position, allows torque transmission from the input shaft portion to the output shaft portion via the first and second common gear wheel (20 and 21 resp.).

3. Gearbox according to claim 1, wherein the second common gear wheel (21) has a smaller diameter than the first common gear wheel (20).

4. Gearbox according to claim 1, wherein the second common gear wheel (21) is arranged—when the first common gear wheel (20) is disengaged from the output shaft (5)—to transmit torque via first gear's gearing with a locked first gear wheel (10) on said first intermediate shaft (3) and locked second gear wheel (16) on the second intermediate shaft (4).

5. Gearbox according to claim 1, wherein the second common gear wheel (21) is arranged to—when the first common gear wheel (20) is disengaged from the output shaft—to transmit torque via third gear's gearing with a locked second gear wheel (11, 16) on both the intermediate shafts (3, 4).

6. Gearbox according to claim 1, wherein both the common gear wheels (20, 21) are mounted on a common hub (22) which is rotatably mounted on the upper shaft (5) and lockable to this by means of coupling means (23).

7. Gearbox according to claim 1, further comprising coupling means, by means of which an input shaft (1) and the output shaft (5) are engageable for torque transmission directly from the input shaft to the output shaft.

* * * * *